United States Patent Office 3,148,168
Patented Sept. 8, 1964

3,148,168
STABILIZATION OF POLYETHYLENE WITH CARBON BLACK AND THIOBISPHENOL
James Harding, Greenbrook Township, Somerset County, N.J., assignor to Union Carbide Corporation, a corporation of New York
No Drawing. Filed Mar. 13, 1956, Ser. No. 571,155
5 Claims. (Cl. 260—41)

This invention relates to improved polyethylene compositions. More specifically it relates to new thermoplastic compositions comprising essentially an ethylene polymer and a minor amount of a thiobisphenol. Such compositions are characterized by minimum odor development and substantial retention of dielectric properties and particularly when exposed to heat.

The new compositions are not onyl stable to the effect of the elevated temperatures usually required in compounding, molding, extruding or otherwise heat-forming the polyethylene compositions, but also show a satisfactory degree of stability at temperatures below the softening point of the polymer and over extended periods of time such as occurs in the use of extruded polyethylene insulation on electrical conductors.

Heretofore it has been recognized that the grease-like to normally solid polymers of ethylene tend to degrade rapidly when held at processing temperatures of the order of 100° C.–300° C. The degradation is evidenced by odor development and poorer dielectric properties, particularly the power factor (or dissipation factor) and the dielectric constant.

A power factor not exceeding 0.0005 at 50 megacycles before and after milling of the polyethylene is required for many civilian and military applications, as demonstrated by MIL–D–3054, proposed military specification LP–590, and others. In practice, it is generally preferred to stay at or below 0.00040 in order to provide some margin of safety. From the data in Tables I, II, and III in this specification, it can be seen that all of the thiobisphenols easily meet this requirement. The rancid-like odor developed in heat-degraded polyethylene makes it unacceptable for use in packaging foods, cosmetics and other products demanding an odor-free packaging material.

To overcome some of the aforementioned problems, it has been proposed to incorporate in ethylene polymers various additives or stabilizers. For example, it has been reported that the addition to polyethylene of small amounts of rubber antioxidants such as the secondary aromatic amines as for example, sym.-di-beta-naphthyl-para-phenylenediamine, aldol alpha-naphthylamine, and phenyl beta-naphthylamine, or sulfur compounds such as thiourea, or phenols such as hydroquinone tend to prevent excessive degradation of the polyethylene's normal dielectric values, but it has been found that these antioxidants cause excessive darkening of the polyethylene, particularly on heating. N,N′-diphenyl-p-phenylenediamine has been used to stabliize the dielectric properties of polyethylene, but its presence in polyethylene is attended by poor color which darkens further on exposure to light and heat.

It is an object of this invention to produce stabilized ethylene polymer compositions having electrical stability, which undergo minimum change in color due to the presence of the stabilizer.

A further object is to provide ethylene polymer compositions capable of being heat-formed into fibers, film, sheeting, wire coatings and molded articles characterized by substantial resistance to rancid odor development and electrical degradation.

Still another object is the preparation of ethylene polymer compositions comprising a major proportion of ethylene polymer and a minor proportion of a thiobisphenol. Further objects will be apparent as the dscription of the invention proceeds.

It has now been found that polyethylene can be effectively stabilized with respect to retention of its dielectric properties together with prevention of rancid odor development by incorporating in polyethylene a relatively small amount of a thiobisphenol having the structural formula

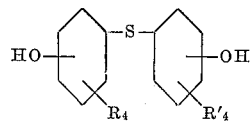

in which R and R′ each represent hydrogen or an alkyl group which may be the same alkyl group in each instance or different, and which thiobisphenol may be symmetrical or unsymmetrical depending upon the distribution of hydrogen versus alkyl groups for R and R′ as well as differences in the alkyl groups.

Such thiobisphenols or phenolic monosulfides are ordinarily prepared by reacting a sulfur halide such as sulfur dichloride with a monohydric mononuclear phenol or a mixture of such phenols, each having at least one of the three positions ortho, ortho, or para to the hydroxyl group unsubstituted and the remaining positions either unsubstituted or substituted by an alkyl group. Position isomers of the thiobisphenol occur when the mononuclear phenol has more than one active nuclear position available for reaction with the sulfur chloride. Such isomers individually or in admixture can be used as stabilizers for polyethylene to obtain the improvements herein described. Unsymmetrical thiobisphenols result when a mixture of monohydric phenols are reacted with the sulfur halide as for example in reacting a mixture of phenol and meta-cresol with sulphur dichloride, the resultant reaction product will contain the isomeric thiobisphenols

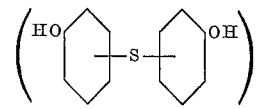

isomeric thiobis-meta-cresols

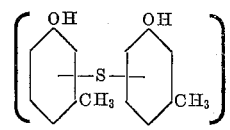

and isomeric hydroxyphenyl m-cresyl sulfides

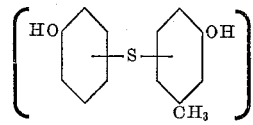

Either the mixed reaction product or the individual thiobisphenols can be used for stabilizing polyethylene. Similarly useful as stabilizers for polyethylene are the thiobisphenols obtained by reacting a sulfur halide with a mixture of different alkyl phenols, as for example a mixture of para-tertiary-butyl phenol and para-tert-tert-octyl phenol.

The preparation of sulfides of monohydric 2,4-dialkyl-phenols has been described in U.S. Patents 2,364,338 and 2,726,277. I have found the thiobisphenols there described can be satisfactorily used for stabilizing polyethylene with substantially the same benefits as obtained from other thiobisphenols containing more or less alkyl groups.

The amount of thiobisphenols employed is preferably between 0.001 percent to about 0.25 percent of the weight of the polyethylene. While amounts larger than 0.20 percent of the thiobisphenol are effective in preventing or inhibiting the usual rancid odor development and loss of dielectric values on heating of the polyethylene, it is observed that the resultant polyethylene compositions tend to exhibit the characteristic but not unpleasant medicinal odor of the thiobisphenol whereas with lesser amounts of thiobisphenol, the odor characteristic of the thiobisphenol cannot be detected by the average individual.

Another advantage of using the preferred amounts of a thiobisphenol is that it does not bloom, i.e., separate out on the surface of processed polyethylene compositions. An objectionable degree of sweat-out or bloom generally occurs at thiobisphenol concentrations of about 0.5 percent by weight.

The thiobisphenol is readily incorporated and uniformly dispersed in polyethylene compositions by mixing on heated mill rolls, in kneaders, in Banbury mixers, or by passing a mixture of polyethylene and the thiobisphenol through heated extruders or similar screw type mixing equipment.

Polyethylene compositions containing stabilizing amounts of a thiobisphenol can be colored by the addition of pigments and dyes, and such colored compositions do not go off-shade after exposure to heat as is the case with polyethylene compositions containing stabilizers such as amines or hydroquinone.

The effectiveness of various thiobisphenols in stabilizing polyethylene as to odor and dielectric properties is further illustrated in the following examples.

EXAMPLE 1

One hundred parts by weight of polyethylene (about 21,000 average mol. wt.) were mixed in a kneader with 0.1 part of 4,4'-thiobis-(6-tertiary-butyl-meta-cresol) for about 15 minutes at a temperature of 135° C.–140° C. This composition, hereinafter identified as (A) was then milled for various periods from five minutes up to three hours at 160° C. and the power factor, dielectric constant, odor and color measured at these different intervals of time. The results are shown in Table I in comparison with a comparable polyethylene composition (B) containing no stabilizer.

It is apparent from an inspection of the results given in Table I that the polyethylene composition (A) containing a thiobisphenol exhibits no odor and substantially no degradation of its dielectric properties even when milled for three hours at 160° C. and that this stabilizer did not cause objectionable color darkening.

A similar series of tests was run using other compounds which have been proposed as stabilizers for polyethylene. Composition (C) was prepared using 0.2 percent N,N'-diphenyl-para-phenylenediamine and composition (D) was prepared using 0.2 percent 2,2-beta(para-hydroxyphenyl) propane, so-called "Bisphenol A." The results are recorded in Table II.

*Table II*

| Composition | Minutes Milling | Power Factor at 50 mc. | Dielectric Constant at 50 mc. | Color, Blue Light Reflectance | Bloom |
|---|---|---|---|---|---|
| C | 5 | 0.00036 | 2.3 | 7 | Yes. |
|   | 60 | 0.00037 | 2.3 | 5 | Yes. |
|   | 120 | 0.00037 | 2.3 | 7 | Yes. |
|   | 180 | 0.00037 | 2.3 | 5 | Yes. |
| D | 5 | 0.00046 |  | 65 | None. |
|   | 180 | 0.00071 |  | 38 | None. |

It is apparent from the results recorded in Table II that although composition (C) exhibits no appreciable electrical degradation, it suffers from bloom and discoloration, the composition having an opaque brown color as compared to the original colorless state. Composition (D) exhibits significant electrical degradation such that the composition fails to meet Military Specification MIL–D–3054–A as well as civilian requirements.

The stabilizing properties of other thiobisphenols is illustrated in the next example.

EXAMPLE 2

Five hundred gram portions of a normally solid polyethylene (av. mol. wt. about 27,000) were fluxed and sheeted on a two-roll mill (8″ diameter x 16″ length) having a roll surface temperature of 160° C. To each portion was added the percent by weight quantity of a thiobisphenol as indicated in Table III, and dispersed by milling for an additional five minutes. Test samples were removed and the remainder of the composition was milled for a total of three hours with the roll spacing adjusted so as to maintain an approximately ½″ diameter bank of material in the roll bight, in accordance with the method described in Military Specification MIL–D–3054–A, entitled "Dielectric Material, Polyethylene" and published by the United States Government Printing Office. After the three hour milling period, the milled polyethylene was removed from the rolls and subjected to tests for power factor and color. Table III presents the test data.

*Table I*

| Composition | Antioxidant, percent | Minutes Milling | Power Factor at 50 mc. | Dielectric Constant at 50 mc. | Color,[1] Blue Light Reflectance | Odor [2] | Bloom |
|---|---|---|---|---|---|---|---|
| A | .10 | 5 | 0.00030 | 2.3 | 69 | None | None. |
|   |   | 60 | 0.00033 | 2.3 | 66 | do | Do. |
|   |   | 120 | 0.00039 | 2.3 | 57 | do | Do. |
|   |   | 180 | 0.00037 | 2.3 | 56 | do | Do. |
| B | None | 5 | 0.00044 | 2.3 | 69 | do | Do. |
|   |   | 60 | 0.00139 | 2.3 | 69 | Slight | Do. |
|   |   | 120 | 0.00278 | 2.3 | 69 | Present | Do. |
|   |   | 180 | 0.00525 | 2.4 | 62 | do | Do. |

[1] The color stability of the compositions was determined by measuring their percentage reflectance of blue light on a scale in which 100 represents the reflectance of a white block of magnesium carbonate.

[2] Odor was determined by placing the polyethylene composition in granulated form into clean glass jars which were then sealed. The sealed jars held at room temperature were opened after two weeks' storage and checked for odor content by a panel of three observers.

In the last column of Table III there are reported the oxygen induction periods at 150° C. for polyethylene containing however, in each instance, an 0.05 percent by weight concentration of the specific thiobisphenol.

*Table III*

| Stabilizer | Percent Concentration | Power Factor at 50 Megacycles | | Color, Blue Light Reflectance | | Oxygen Induction Period, Hours [2] |
|---|---|---|---|---|---|---|
| | | After 5 Min. Milling | After 3 Hr. Milling | After 5 Min. Milling | After 3 Hr. Milling | |
| None | 0.00 | 0.00044 | 0.00525 | 69 | 62 | 3.5 |
| Thiobisphenol, M.P. 130° C. | 0.10 | 0.00029 | 0.00032 | 43 | 30 | 10.5 |
| Thiobis-m-cresol, M.P. 140° C. | 0.10 | 0.00031 | 0.00027 | 53 | 38 | 12.5 |
| 2,2'-thiobis-p-cresol, M.P. 112° C. | 0.10 | 0.00031 | 0.00022 | 72 | 53 | 11.0 |
| 6,6'-thiobis-(2,4-xylenol) M.P. 90° C. | 0.10 | 0.00030 | 0.00030 | 53 | 45 | 12.5 |
| Thiobis-(3,4-xylenol) | 0.10 | 0.00032 | 0.00034 | 57 | 35 | 7.0 |
| 4,4'-thiobis-(2,5-xylenol) | 0.10 | 0.00016 | 0.00020 | 60 | 53 | 15.0 |
| 4,4'-thiobis-(2-methyl-5-isopropyl phenol), M.P. 169° C. | 0.10 | 0.00030 | 0.00030 | 47 | 50 | 15.0 |
| 4,4'-thiobis-(2-isopropyl-5-methyl phenol) | 0.10 | 0.00036 | 0.00033 | 55 | 21 | 10.0 |
| 4,4'-thiobis-(6-tert-butyl-m-cresol), M.P. 148° C. | 0.05 | 0.00020 | 0.00022 | 65 | 68 | 25 |
| | 0.10 | 0.00030 | 0.00037 | 69 | 56 | Not tested |
| 2,2'-thiobis-(6-tert-butyl-p-cresol) | 0.10 | 0.00023 | 0.00026 | 58 | 49 | 15 |
| "Santowhite MK" [1] | 0.10 | 0.00022 | 0.00022 | 62 | 47 | Not tested |
| Thiobis-(di-sec-amylphenol) | 0.10 | 0.00021 | 0.00038 | 67 | 49 | Not tested |
| 2,2'-thiobis-(4,6-di-tert-butyl-m-cresol), M.P. 195–200° C. | 0.10 | 0.00028 | 0.00039 | 58 | 34 | 5.5 |

[1] Registered trademark of Monsanto Chemical Co. for a thiobisphenol reaction product of 6-tert-butyl-m-cresol and sulfur dichloride.
Power factor was determined by Method 4021 of Federal Specification L-P-406, "Plastics, Organic: General Specifications, Test Methods," available from Superinetnent of Documents, U.S. Government Printing Office.
[2] The test for oxygen induction period was conductdd in the following manner.

One hundred grams of polyethylene were fluxed and sheeted on a two-roll mill (6″ diameter x 12″ long rolls; roll surface temperature about 100° C.) and 0.05 gram (i.e., 0.05 percent) of the indicated thiobisphenol was then added to the plastic mass on the mill and thoroughly dispersed therein by milling the mixture for about 10 minutes. The rolled sheet was removed and cooled and a 0.20 gram sample of the polyethylene composition ground to pass through a standard U.S. 40 mesh screen was charged to a 200 cc. size Norma-Hoffman oxygen bomb, the ground material being dispersed through a cylindrical glass wool plug to insure intimate oxygen contact. The sample-containing bomb was charged with oxygen to a pressure of about 50 p.s.i., placed in an oil bath at 140° C., brought to temperature, the oxygen pressure adjusted to exactly 50 p.s.i., the bomb valves closed tightly and the oxygen pressure was then noted periodically and recorded until the pressure had dropped to 40 p.s.i. The oxygen pressure remains constant (50 p.s.i.) at first, then drops slowly and at a substantially linear rate until it reaches 40 p.s.i. at which point the test is terminated. This substantially linear portion of the time-pressure curve is extrapolated back to 50 p.s.i.; and the so determined time during which the initial pressure remains constant is identified as the oxygen induction period. This test provides a method of estimating, in an extremely accelerated manner, the effectiveness of an antioxidant in improving the resistance of the polyethylene to the property-degrading oxidation by atmospheric oxygen which occurs during the compounding and use of polyethylene compositions.

The color reflectance values reported in Table III show certain of the thiobisphenols cause less color change, if any, than the value for unstabilized polyethylene. However, all the values are significantly higher than is shown in Table II for N,N'-diphenyl-para-phenylenediamine, a known power factor stabilizer for polyethylene but which is otherwise most unsatisfactory as regards the color it imparts to polyethylene.

The effectiveness of the thiobisphenols in preventing development of a rancid-like odor is further demonstrated in the following example.

EXAMPLE 3

One pound of a commercial normally solid polyethylene (about 20,000 av. mol. wt.) was fluxed and sheeted on a two-roll mill (8″ diameter x 16″ rolls; roll temperature about 100° C.; roll opening about 1/8"). Pigment, if any, and the specific thiobisphenol were then added, in that order, to the plastic mass on the mill and dispersed by milling about two more minutes then end-passing the sheet through the roll bight 12 times. The sheet was then removed from the rolls, cooled and granulated to pass through a 5/16" screen. A square, wide-mouth, 2-oz. bottle was half-filled with said granules, capped and placed in a 100° C. oven. The bottle was removed periodically, opened and checked immediately for rancid odor. Samples were examined every hour the first day and once every day thereafter.

In Table IV and in the comments which follow: the thiobisphenol concentrations cited are in parts by weight per 100 parts polyethylene resin; the "pigmented" compositions contain, in addition to the polyethylene resin and thiobisphenol shown, one part pigment per 100 parts resin, this being Du Pont Pigment BON Red, Dark RT–695–D, a manganese pigment of the type known to aggravate odor formation in polyethylene compositions. This manganese pigment, whose counterpart is offered by several manufacturers under various trade names, is the manganese salt of 2-(2'-hydroxy-3'-carboxynaphthazo)-4-chloro-5-methylbenzenesulfonic acid.

Table IV

| Antioxidant | Wt. Percent Concentration | Time to Develop Odor in 100° C. oven | |
|---|---|---|---|
| | | Unpigmented Compositions | Pigmented Compositions |
| None | | 2–3 days | 3 hours. |
| 4,4'-thiobis-(6-tert-butyl-m-cresol) | 0.001 | 10 days | 4 hours. |
| "Santowhite MK" | 0.002 | 11 days | 5 hours. |
| Thiobis-(di-sec-amyl phenol) | 0.02 | OK | OK. |
| 4,4'-thiobis-(2-methyl-5-isopropyl-phenol) | 0.05 | OK | OK. |
| Thiobisphenol | 0.05 | OK | not tested. |
| Thiobis-m-cresol | 0.05 | OK | Do. |
| 2,2'-thiobis-p-cresol | 0.05 | OK | Do. |
| 6,6'-thiobis-(2,4-xylenol) | 0.05 | OK | Do. |
| Thiobis-(3,4-xylenol) | 0.05 | OK | Do. |
| 4,4'-thiobis-(2,5-xylenol) | 0.05 | OK | Do. |
| 4,4'-thiobis-(2-isopropyl-5-methyl-phenol) | 0.05 | OK | Do. |
| 4,4'-thiobis-(6-tert-butyl-m-cresol) | 0.05 | OK | Do. |
| 2,2'-thiobis-(6-tert-butyl-p-cresol) | 0.05 | OK | Do. |
| "Santowhite MK" | 0.05 | OK | Do. |
| Thiobis-(di-sec-amyl phenol) | 0.05 | OK | Do. |
| 2,2'-thiobis-(4,6-di-tert-butyl-m-cresol) | 0.05 | OK | Do. |

In the above table "OK" signifies that the respective compositions were still free from a rancid odor when examined 47 days after the start of the test, although the hot sample may have an odor characteristic of the particular thiobisphenol therein present. Thus the hot compositions containing 4,4'-thiobis-(2,5-xylenol); 2,2'-thiobis-(6-tert-butyl-p-cresol); 2,2'-thiobis-(4,6-di-tert-butyl-m-cresol); thiobis-(3,4-xylenol); 4,4'-thiobis-(2-isopropyl-5-methylphenol); thiobis-(di-sec-amyl-phenol) and "Santowhite MK" while free from any rancid odor after 47 days at 100° C., did have, however, a noticeable medicinal odor. On the other hand, hot compositions containing 6,6'-thiobis-(2,4-xylenol); thiobisphenol and 4,4'-thiobis-(2-methyl-5-isopropyl-phenol) had only a mild odor characteristic of such thiobisphenols. The other samples under test had very little or no odor even when hot, these being the samples containing thiobis-m-cresol; 2,2'-thiobis-p-cresol; and 4,4'-thiobis-(6-tert-butyl-m-cresol).

It is evident from the data presented in the above table that while a concentration of stabilizer in an amount as small as 0.02 percent by weight of the polyethylene is effective for preventing odor in both pigmented and unpigmented compositions for at least 47 days, concentrations as small as 0.001 percent nevertheless effect a significant improvement over the stabilizer-free control sample of polyethylene.

Ordinarily a pigment or inert mineral filler concentration not in excess of about one percent by weight of the polyethylene does not appreciably impair the power factor value of the composition, particularly when employing materials such as zinc oxide, titanium dioxide, clays, silica or calcium carbonate. Carbon black, however, should not be used in concentration more than about 0.5 percent by weight when a power factor not exceeding 0.0005 at 50 megacycles is desired. At higher concentrations of carbon black, e.g. 2 to 5 percent by weight, outdoor weathering of the polyethylene composition is greatly improved and such compositions are adequate for less exacting high frequency current applications and for both outdoor and indoor insulation of commercial power lines.

While higher concentration of fillers or pigments such as are described above are known to raise the power factor of polyethylene, nevertheless the presence of a thiobisphenol in such polyethylene composition has been found to prevent detrimental changes in the original dielectric values attendant from the use of such fillers or pigments upon aging of these compositions or exposure to heat.

This application is a continuation-in-part of my copending application Serial No. 465,424, filed October 28, 1954.

What is claimed is:

1. A composition consisting essentially of polyethylene, .5 to 5 percent by weight, based on the weight of the polyethylene, of carbon black and .01 to .5 percent by weight, based on the weight of the polyethylene, of 4,4'-thiobis-(6-tertiary-butyl-m-cresol).

2. A composition comprising polyethylene, .5 to 5 percent by weight, based on the weight of the polyethylene, of carbon black and .01 to .5 percent by weight, based on the weight of the polyethylene, of 4,4'-thiobis-(6-tertiary-butyl-m-cresol).

3. A composition comprising a mixture consisting of polyethylene, carbon black and 4,4'-thiobis-(6-tertiary-butyl-m-cresol), the carbon black being present in 2 to 5 percent by weight, the 4,4'-thiobis-(6-tertiary-butyl-m-cresol) being present in .01 to .5 percent by weight, the remainder of the mixture being polyethylene.

4. Polyethylene composition containing a stabilizing amount of a thiobisphenol having the formula

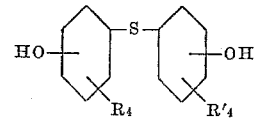

wherein each R and R' is selected from the group consisting of hydrogen and alkyl, said amount being between 0.001 percent and 0.5 percent by weight of the polyethylene, said composition containing a pigmenting amount of carbon black, said amount of thiobisphenol being sufficient to inhibit rancid odor development in the polyethylene.

5. A polyethylene composition comprising a normally solid polymer of ethylene and an amount of thiobis-(di-amyl phenol) effective to prevent rancid odor development.

References Cited in the file of this patent
UNITED STATES PATENTS

| 2,662,061 | Gilcrease et al. | Dec. 8, 1953 |
| 2,670,382 | Downey et al. | Feb. 23, 1954 |
| 2,675,366 | Pullman | Apr. 13, 1954 |
| 2,716,096 | Young et al. | Aug. 23, 1955 |
| 2,726,277 | Downey | Dec. 6, 1955 |

FOREIGN PATENTS

| 201,160 | Australia | Jan. 11, 1956 |

OTHER REFERENCES

Raff et al.: "Polyethylene" (Interscience, 1956), pages 103–106.

UNITED STATES PATENT OFFICE
CERTIFICATE OF CORRECTION

Patent No. 3,148,168            September 8, 1964

James Harding

It is hereby certified that error appears in the above numbered patent requiring correction and that the said Letters Patent should read as corrected below.

Column 1, line 17, for "onyl" read -- only --; line 57, for "stabliize" read -- stabilized --; column 4, line 11, for "-beta" read -- -bis --; columns 5 and 6, Table III, under the heading "Power Factor at 50 Megacycles After 3 Hr. Milling" for "0.00038" read -- 0.00028 --.

Signed and sealed this 13th day of April 1965.

(SEAL)
Attest:

ERNEST W. SWIDER
Attesting Officer

EDWARD J. BRENNER
Commissioner of Patents